Sept. 7, 1937.  E. W. BAUER  2,092,298
ELECTRICAL SWITCH FOR LIQUID LEVEL GAUGES
Filed Nov. 15, 1934
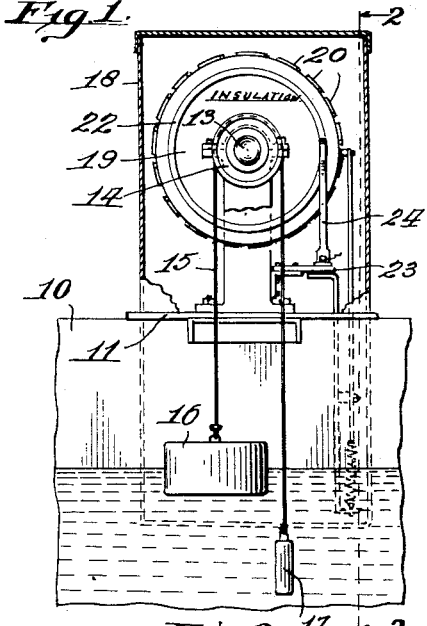
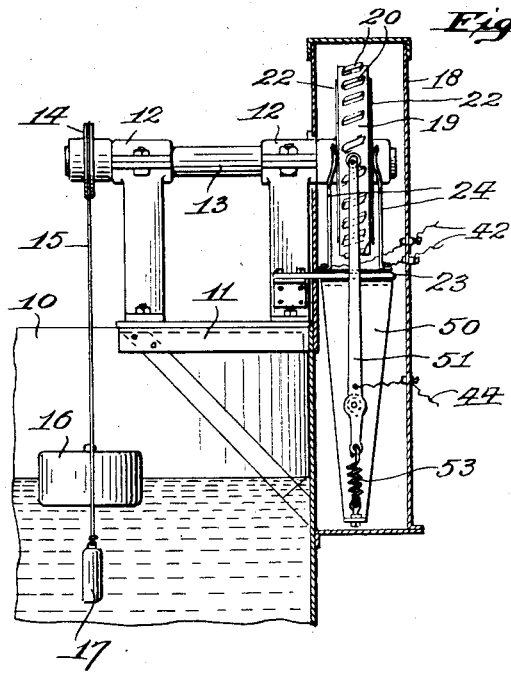
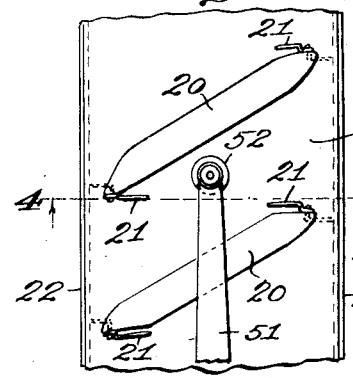
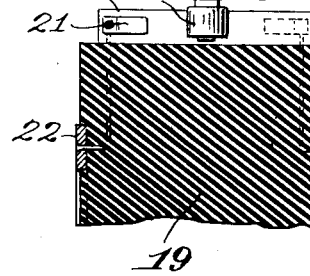
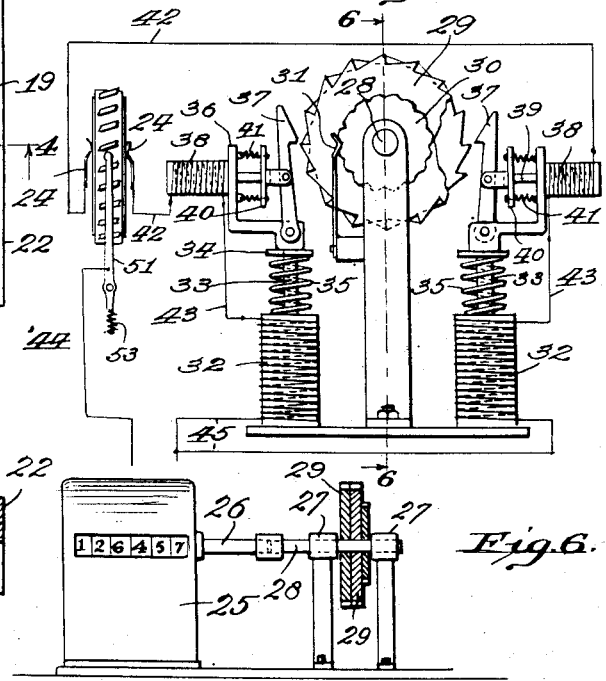
Inventor
Edward W. Bauer
By Martin C. Smith
Attorney Patented Sept. 7, 1937

2,092,298

UNITED STATES PATENT OFFICE 2,092,298

ELECTRICAL SWITCH FOR LIQUID LEVEL GAUGES

Edward W. Bauer, Ocean Park, Calif.

Application November 15, 1934, Serial No. 753,233

1 Claim. (Cl. 200—6)

My invention relates to an electrical switch especially designed for use in connection with apparatus that is especially designed for automatically indicating at all times the level of liquids in tanks or containers and the indicating means forming a part of the invention may be located at any distance from the tank or container with which the device is associated.

In the storage of oil it is the general practice to provide a number of large tanks which serve as containers for the oil before and after it is refined and it is essential that an accurate reading be maintained at all times of the oil or liquid contained in these tanks due to the fact that as production increases or decreases the level in the tanks constantly or periodically rises or lowers.

The principal object of my invention is, to provide an electrical switch for remote liquid level registering apparatus which switch includes a drum operated by a float or the like within the tank with which the apparatus is associated and said drum carrying electrical contacts that are engaged by a swinging or pivoted contact arm arranged to move in opposite directions and which in operation causes instantaneous electrical impulses to occur in the electric circuit that leads to the remotely located registering device.

With the foregoing and other objects in view my invention consists in certain novel features of construction and arrangements of parts that will be hereinafter more fully described and claimed and illustrated in the accompanying drawing in which:

Fig. 1 is an elevational view partly in section, of a portion of a tank or container and showing the float operated contact drum.

Fig. 2 is a vertical section taken on the line 2—2 of Fig. 1.

Fig. 3 is an elevational view of a portion of the float operated drum and showing the electrical contacts carried thereby.

Fig. 4 is a detail section taken on the line 4—4 of Fig. 3.

Fig. 5 is an elevational view of the duplex ratchet and pawl arrangement that is operated by the electrical impulses from the contact drum and which is effective in imparting rotary motion to the conventional registering device.

Fig. 6 is an elevational view of the register and showing the driving connections from the duplex ratchet wheels to said registering device.

Referring by numerals to the accompanying drawing which illustrates a preferred embodiment of my invention, 10 designates a tank or container, at the top of which is arranged a fixed support 11 and mounted on said support are bearings 12 for a horizontally disposed shaft 13.

Fixed on the end of shaft 13, above the tank, is a grooved wheel or pulley 14, over which operates a cable 15, one end of said cable carrying a float 16 that rests on top of the liquid within the tank and the other end of the cable carrying a counterbalancing weight 17.

Arranged on the outside of the tank and enclosing the outer end of shaft 13, is a suitable housing 18 and fixed on the end of the shaft 13 that projects into said housing, is a drum 19 of suitable insulating material.

Formed integral with or fixed to the periphery of this drum, is a series of transversely inclined ribs or lugs 20 that are spaced equi-distant apart.

Projecting inwardly from each end of each rib or lug and on opposite sides thereof, are short contact members 21 of resilient metal.

Secured to both side faces of the drum 20, are contact rings 22 and all of the adjacent contact members 21 on one side of the drum are connected to one of these rings 22 and all of the contact members on the other side of the drum are connected to the other ring.

Suitably supported within housing 18, below the drum 19, is a platform 23 and mounted thereon and insulated therefrom are upstanding contact springs 24, the free upper ends of which have brush contact respectively with the contact rings 22.

Depending from plate 23 and insulated therefrom, is a bracket 50 and pivotally mounted thereon, is an upright arm 51, the upper end of which terminates adjacent the periphery of drum 19 and carried by the upper end of said arm, is a roller 52 that is adapted to ride upon the upper and lower faces of the ribs or lugs 20.

A retractile spring 53 connects the lower end of this swinging arm with the lower end of bracket 50 and under normal conditions said spring maintains the arm in an upright position, as illustrated in Figs. 2 and 3, with the roller 52 occupying a position midway between the sides of drum 19 and between a pair of the contacts 21 that are carried by the ends of the ribs or lugs 20.

Located at a point remote from the tank or container, is a conventional registering device 25 having discs or the equivalent thereof calibrated so as to indicate feet, inches and fractions thereof and which discs are arranged so as to operate in both directions or forwardly and rearwardly as the main shaft 26 of said registering device is rotated in either direction.

Positioned adjacent to the registering device, are bearings 27 for shaft 28 that is directly connected to the main shaft of the registering device and fixed on said shaft are two ratchet wheels 29, with the teeth thereof reversely arranged. In other words, the teeth of one ratchet wheel project in one direction and the teeth of the other ratchet wheel project in the reverse direction.

Fixed on shaft 28, adjacent the ratchet wheels, is a disc or wheel 30 provided in its periphery with notches to correspond with the teeth of the ratchet wheel and adapted to engage in the notches of this disc is the free end of a detent spring 31.

The construction just described provides means for holding the ratchet wheels and shaft 26 against over-rotation or spinning when the same are actuated by the rapidly moving pawls.

Mounted below the ratchet wheels 29 and on opposite sides thereof, are solenoid coils 32, each provided with a core or armature 33 which when the coil is energized, is drawn downwardly into said coil and interposed between the upper end of each coil and a plate 34 that is carried by the upper end of each core, is an expansive coil spring 35.

Mounted on top of each plate 34, is an L-shaped bracket 36 and pivotally connected to the lower portion of each bracket in line with the core, is the lower end of a pawl 37. One of these pawls is adapted to engage the teeth of one of the ratchet wheels while the other pawl engages the teeth of the other ratchet wheel.

Mounted on the vertical arm of each L-shaped bracket 36, is a solenoid coil 38 of the repulsion type, each coil having an armature or core 39 that is moved outward as the corresponding coil is energized.

The outer end of each core 39 is pivotally connected to the intermediate portion of the adjacent pawl 37.

Mounted on each core 39 is a short cross arm 40 and connecting the ends of each cross arm with the vertical leg of the adjacent bracket, are retractile springs 41.

Under normal conditions or while the coils 38 are not energized, the springs 41 exert pull upon the cores 39 and pawls 37 so as to hold the same out of engagement with the teeth of the ratchet wheels 29, as illustrated in Fig. 5.

The brush contacts 24 are electrically connected to the respective coils 38 by conductors 42 and said coils 38 are connected to the respective coils 32 by conductors 43. One side of a source of electric current supply is connected by a conductor 44 to swinging arm 51 and the other side of the supply line is connected by branch conductors 45 to coils 32 (see Fig. 5).

The operation of my improved remote reading liquid level gauge is as follows:

As the level of the liquid in tank 10 rises or lowers, the float 16 is correspondingly raised or lowered, thereby imparting rotary motion to shaft 13 through cable 15 and drum 14.

As drum 19 that is carried by shaft 13, is rotated, the roller 52 carried by the upper end of swinging arm 51 will engage against the underface of one of the ribs or lugs 20 or the upper face of the next adjacent rib or lug and as said ribs or lugs are inclined, the roller after engaging one of the lugs, will ride downwardly along the inclined face thereof, thereby imparting swinging movement to arm 50 and which movement is yieldingly resisted by spring 53.

As the roller 52 rides off the end of the rib 20 upon which it has bearing, spring 53 under tension, will act to instantly restore the arm 52 to its normal position and at the beginning of such movement, the roller will ride over the contact 21 at the end of the rib around which the roller passes, thereby momentarily closing the electric circuit so as to produce an electric impulse through the corresponding one of the coils 38 and 32. This impulse passes from supply line conductor 44 to arm 51, thence through roller 52, thence through contact 21, over which said roller passes, thence to the corresponding contact ring 22 on the side of drum 19, thence through the corresponding conductor 42 to the corresponding coil 38 and thence through the corresponding conductor 43, through corresponding coil 32 and thence through the corresponding conductor 45 to the supply line.

As repulsion coil 38 is energized, its core 39 will be moved outward, thereby bringing about engagement of the corresponding pawl 37 with the teeth of one of the ratchet wheels and as the corresponding coil 32 is energized, its core 33 will be drawn downward and through the pawl 37, the engaged ratchet wheel and shaft 28 upon which the same is mounted, will be rotated the distance of one tooth.

After the roller 52 passes over one of the contacts 22, to produce an impulse as just described, the circuit will be broken and the various parts of the device will return to their normal positions as illustrated in Fig. 5.

As shaft 28 is partially rotated as just described, corresponding rotary movement will be imparted to shaft 26 of the registering device and one or more of the discs therein will be partially rotated so as to show an increase or decrease of the liquid level of the tank with which the registering device is associated.

Thus an attendant by observing the numbers appearing on the registering device, may at all times know the exact amount of liquid contained in the tank with which the device is associated and this condition will prevail regardless of whether the liquid is being pumped into the tank or pumped therefrom.

While my improved remote reading liquid level gauge is particularly intended for use in connection with tank farms associated with oil fields and refineries, it will be understood that the device may be conveniently employed with any tank or container where an accurate indication of the level of liquid in the tank or container is desired.

An especially desirable feature of the invention is, that it is constructed to operate in both directions, that is, as the liquid level rises or lowers in the tank or container and as the engagement of the roller 52 carried by the swinging arm makes instantaneous contact with one of the contact members 22, an electrical impulse is transmitted to the registering device operating means so as to move same one graduation, thereby giving at all times an accurate registration of the total volume of liquid contained in the tank with which the device is associated.

It will be noted that the inclined ribs are arranged on the periphery of drum 19 so that the contacts 21 carried by the ends of said ribs are disposed in direct transverse alignment with each other. In other words, the contact on the end of one of the ribs is in direct transverse alignment with a contact on the end of the next adjacent rib.

As will be understood the drum rotates in opposite directions as the float rises or lowers with the oil level in the tank and therefore both members of any given pair of contacts 21 that are in transverse alignment with each other, represents or corresponds with the same liquid level within the tank so that the device operates accurately to indicate the exact liquid level regardless of the direction of rotation of the drum 19, which is actuated by the float.

If the gauge is constructed and calibrated so as to indicate inches, then when the float rises an inch in the tank, the register 25 will be actuated to show an increase of one inch of liquid in the tank or if the float lowers an inch, then the indicator will be reversely operated so as to indicate the lowering of the liquid one inch within the tank.

Thus it will be seen that I have provided an electrical switch for remote reading liquid level gauge that is relatively simple in construction, inexpensive of manufacture and very effective in performing the functions for which it is intended.

It will be understood that minor changes in the size, form and construction of the various parts of my improved switch may be made and substituted for those herein shown and described without departing from the spirit of my invention, the scope of which is set forth in the appended claim.

I claim as my invention:

In a remote reading liquid level gauge, a rotatably mounted member, spaced ribs on the periphery of said member, the sides of which ribs are provided with parallel inclined faces, contacts projecting inwardly from the ends of each rib on opposite sides thereof, a pivotally mounted member, contact means carried by one end of said member for engaging the inclined faces of the ribs and the contacts projecting inwardly from the ends thereof as said rotatably mounted member is rotated, a spring associated with said pivotally mounted member for normally holding the same so that the contact member carried by the end thereof occupies an intermediate position between the contacts on the ends of the ribs, rings carried by the sides of the rotatably mounted member, all of the contacts at the ends of the ribs on one side of the rotatably mounted member being connected to one of said rings and all of the contacts on the ends of the ribs on the other side of the rotatably mounted member being connected to the other one of said rings.

EDWARD W. BAUER.